J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 1.
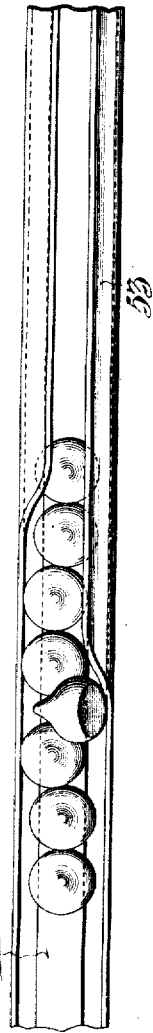
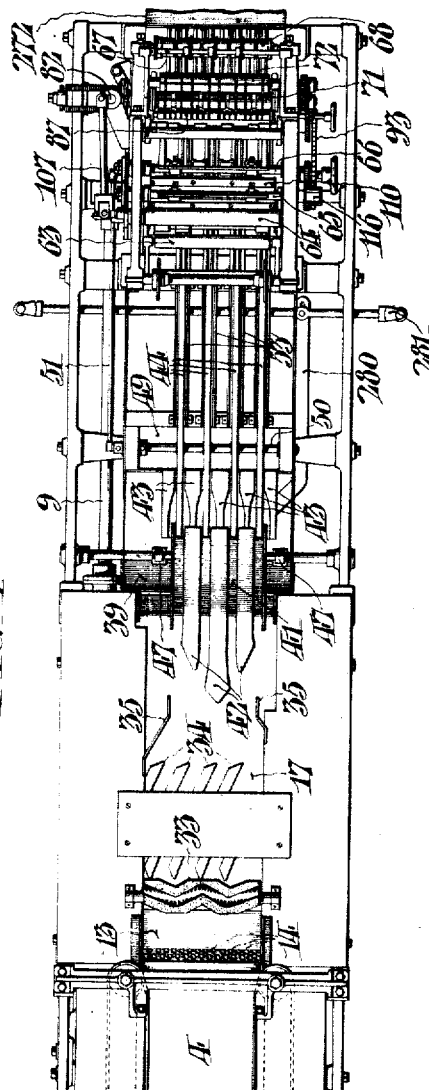
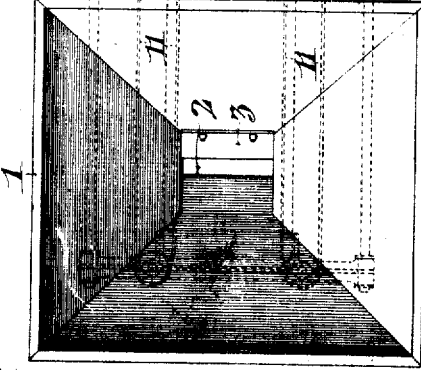

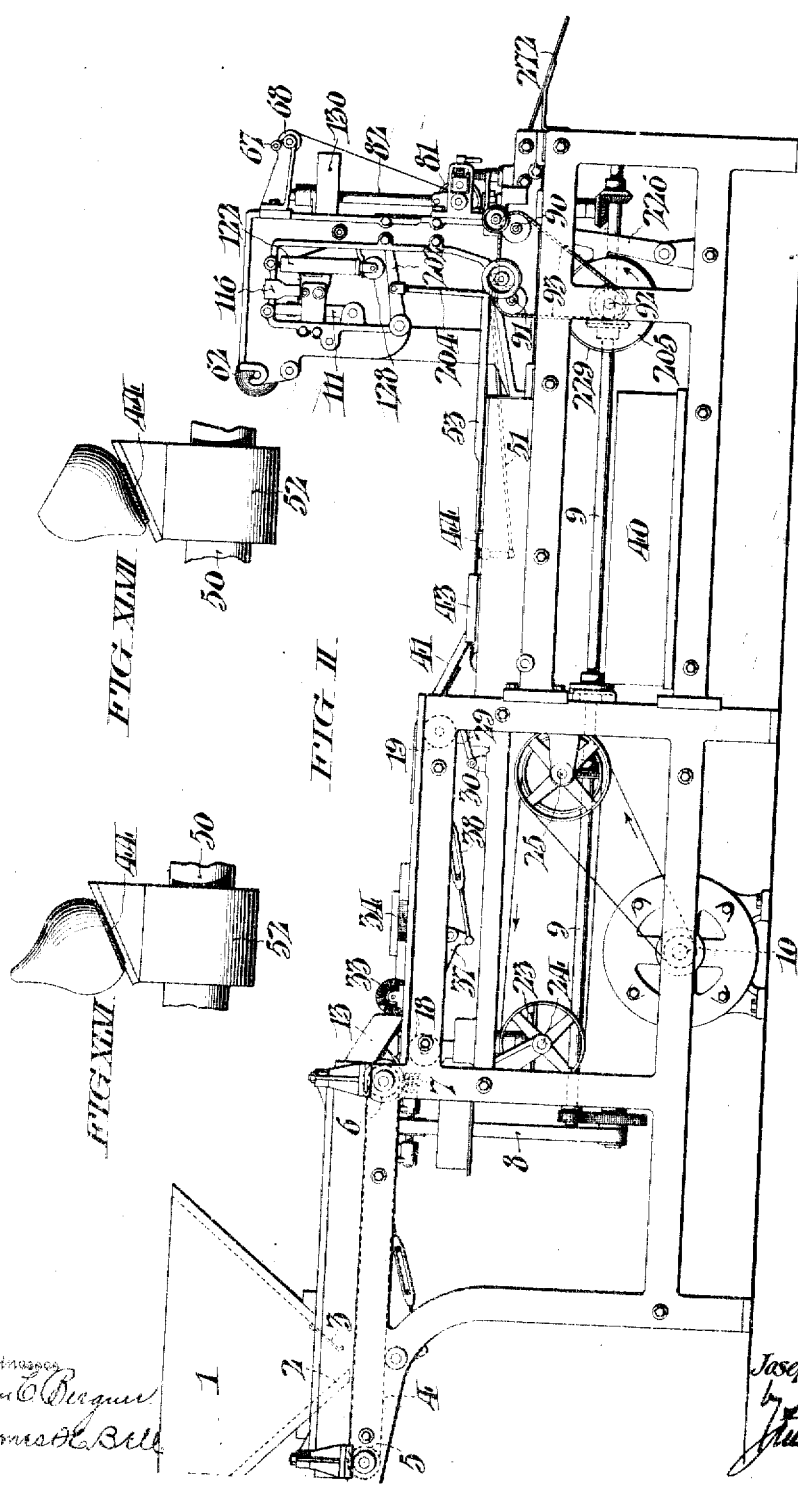

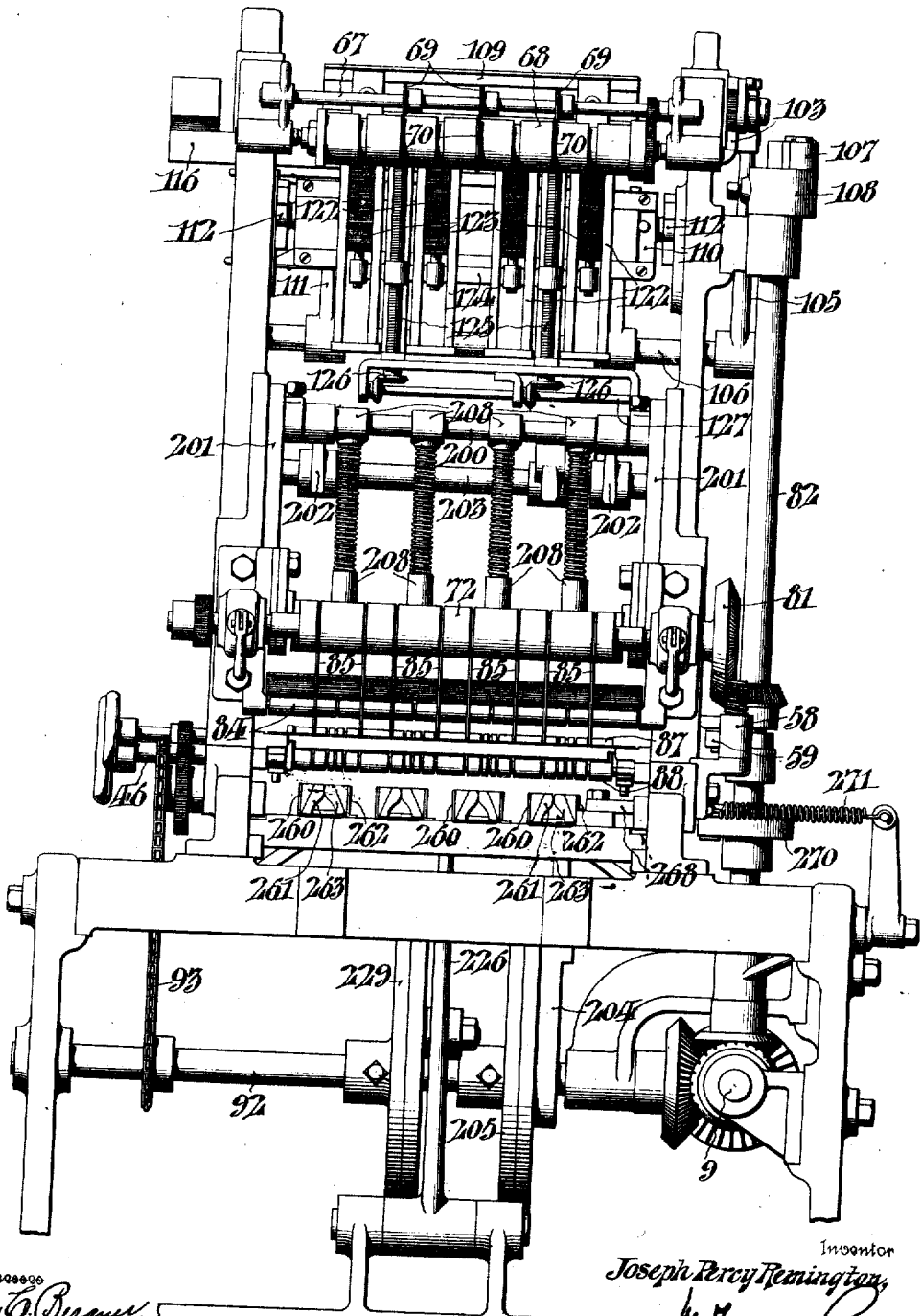

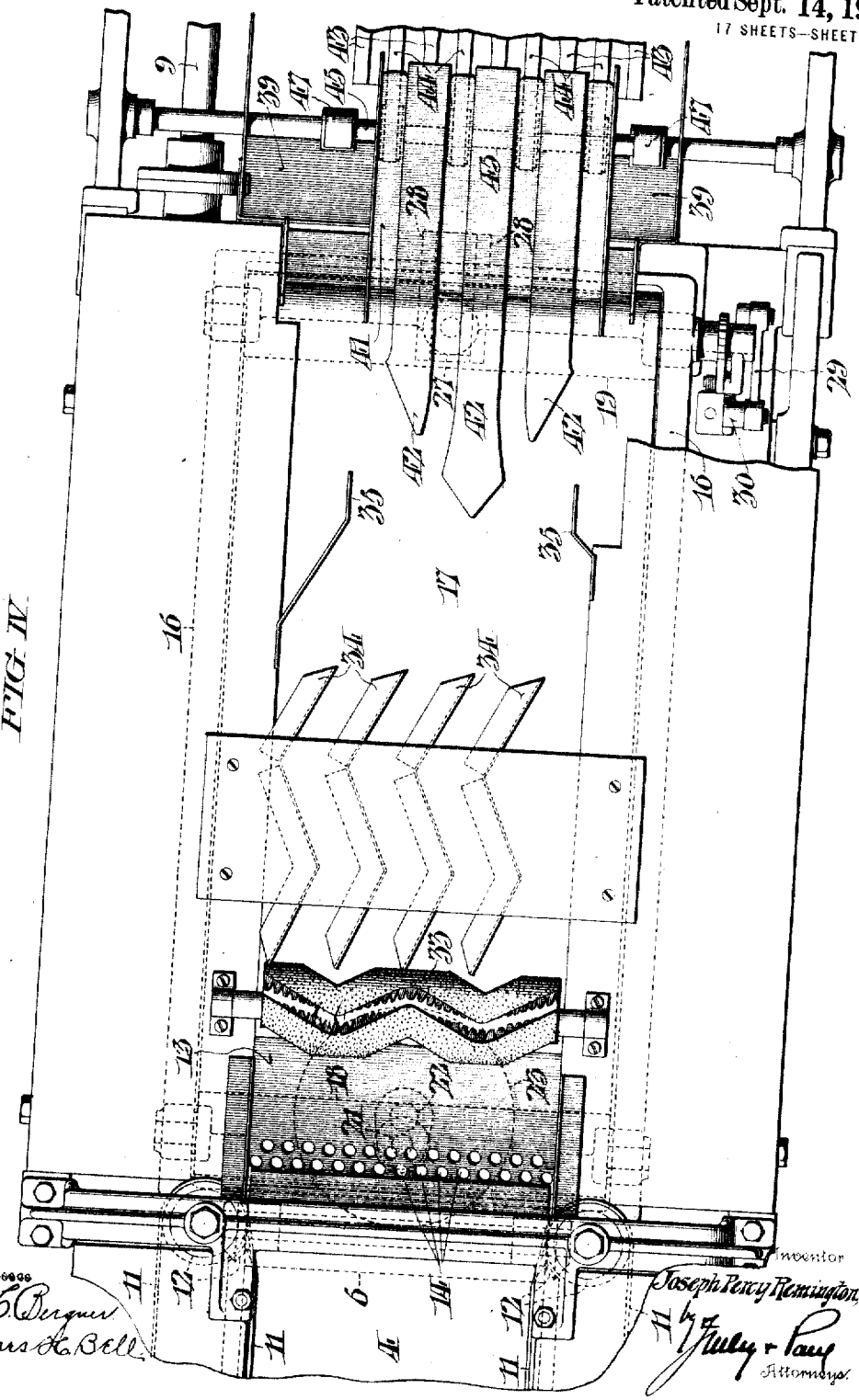

J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 5.
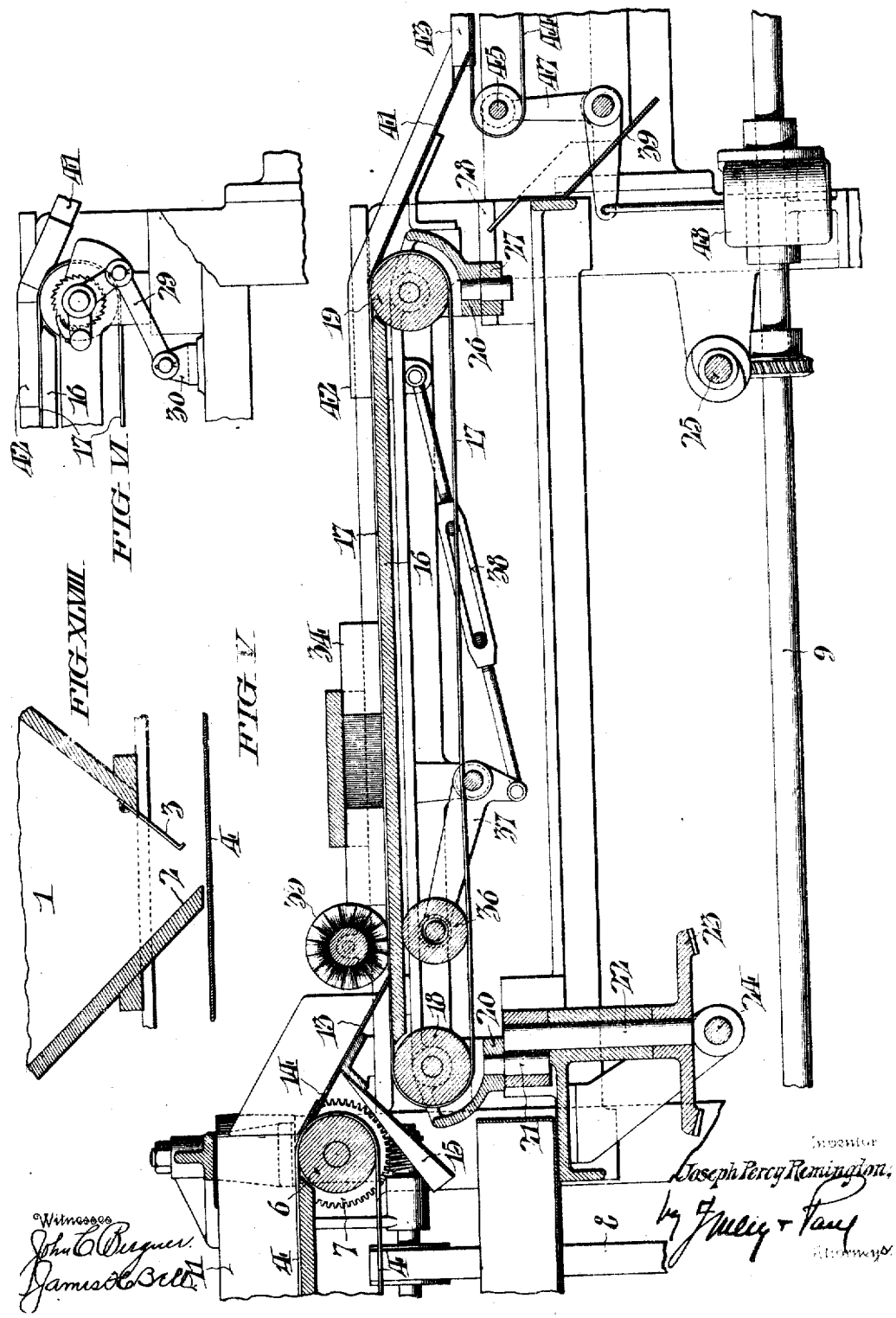

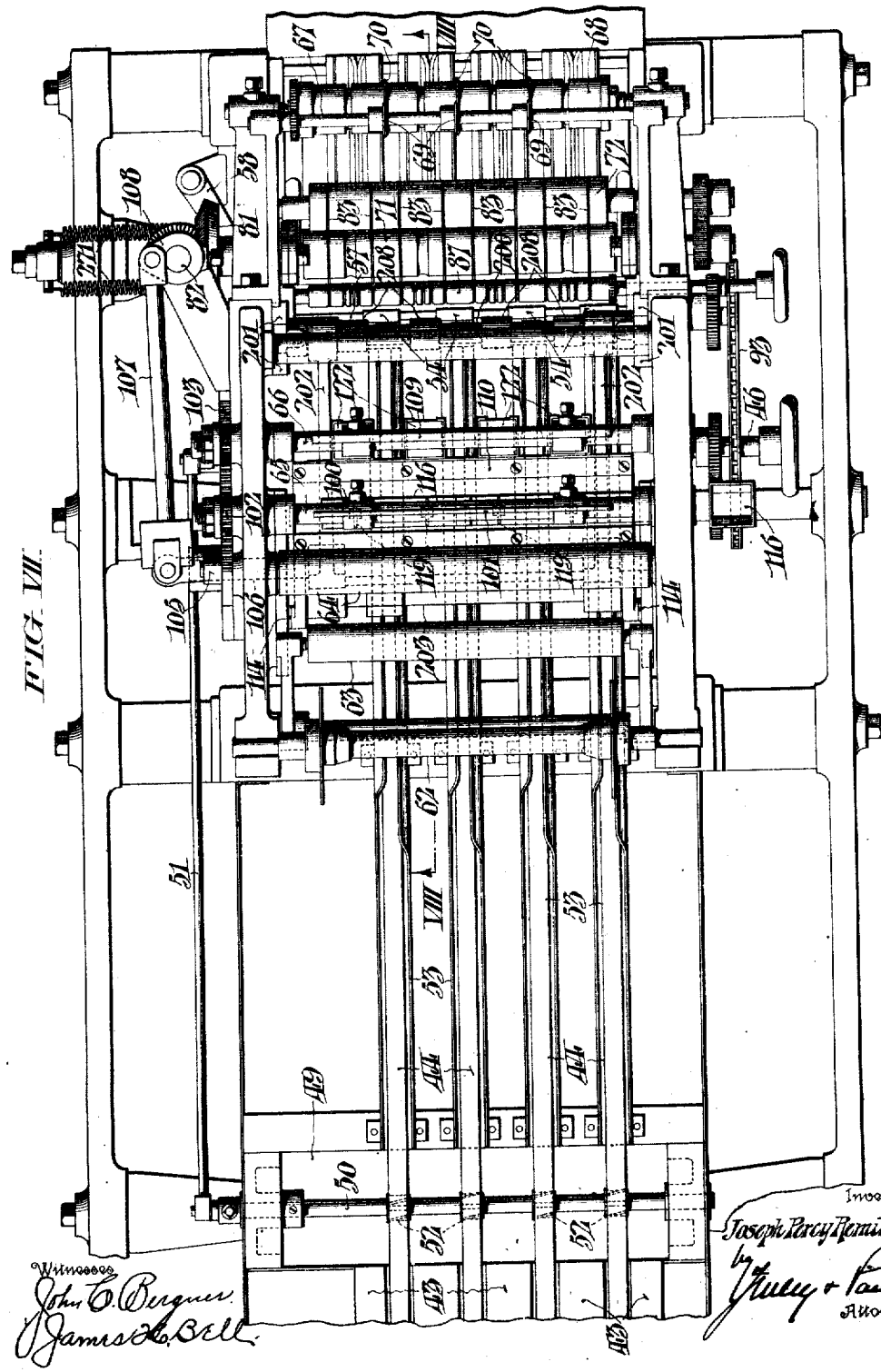

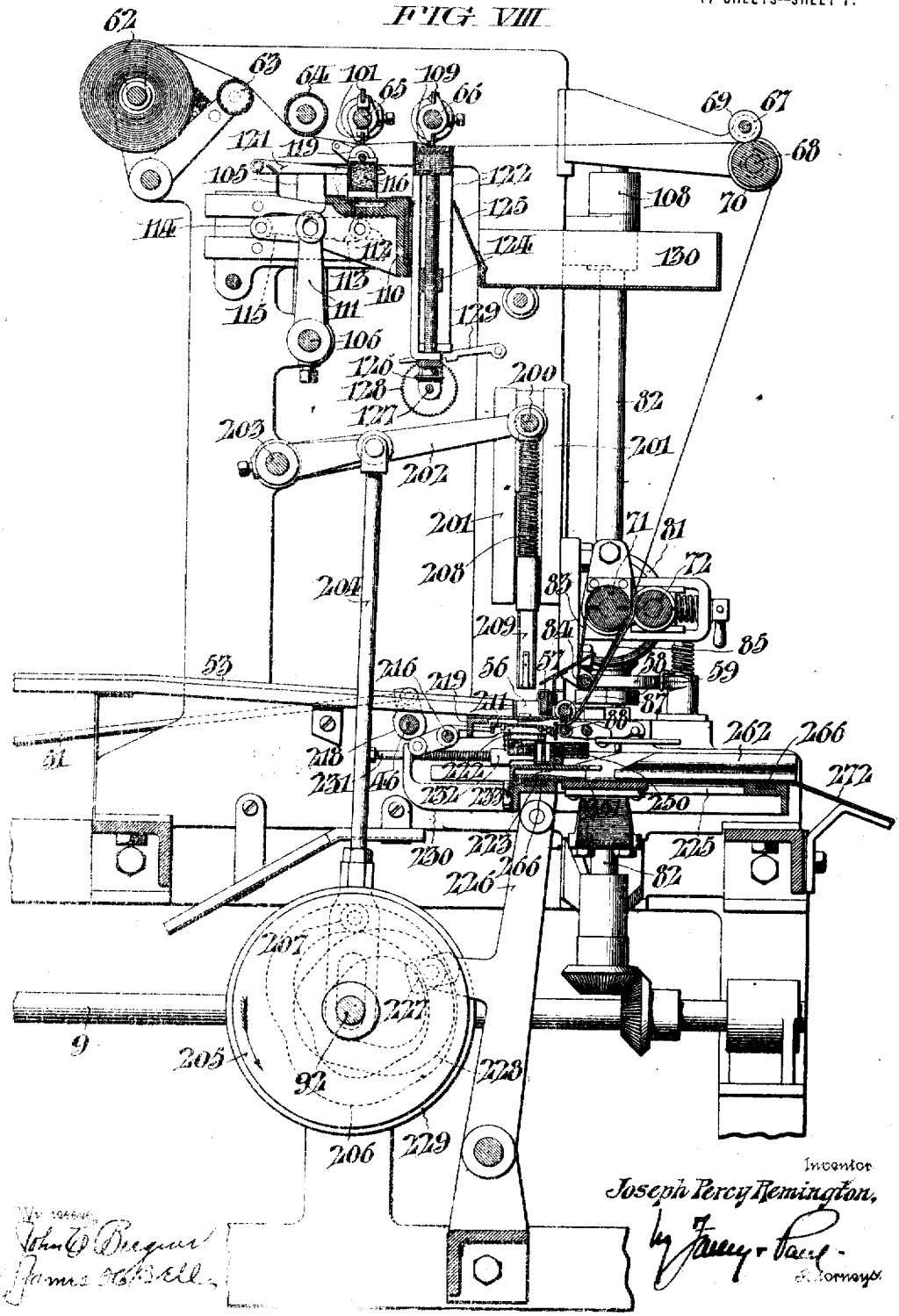

J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 8.
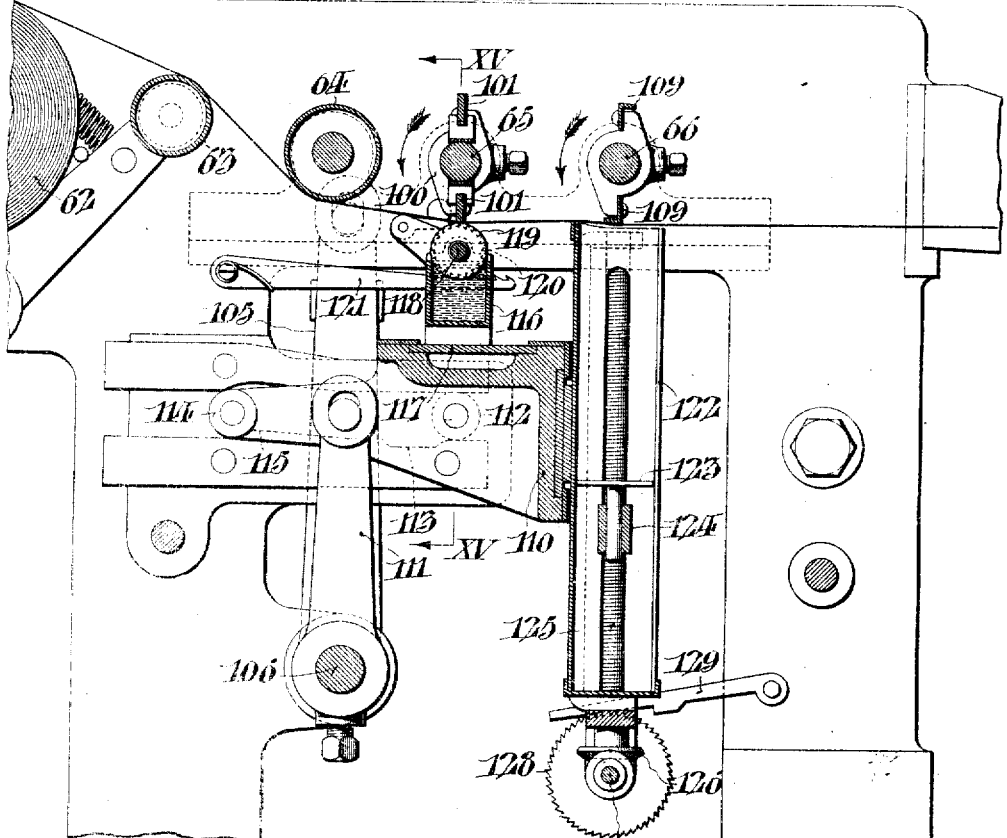
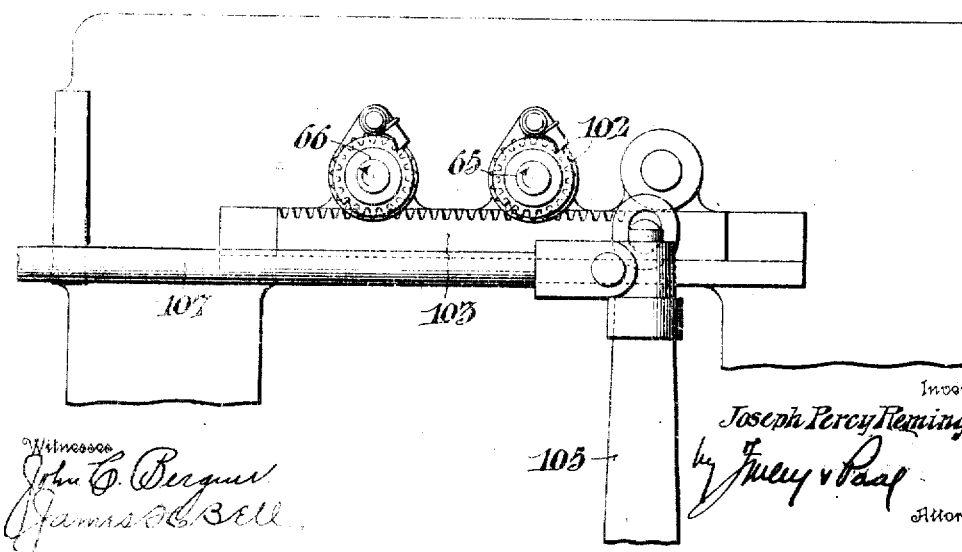

J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 9.
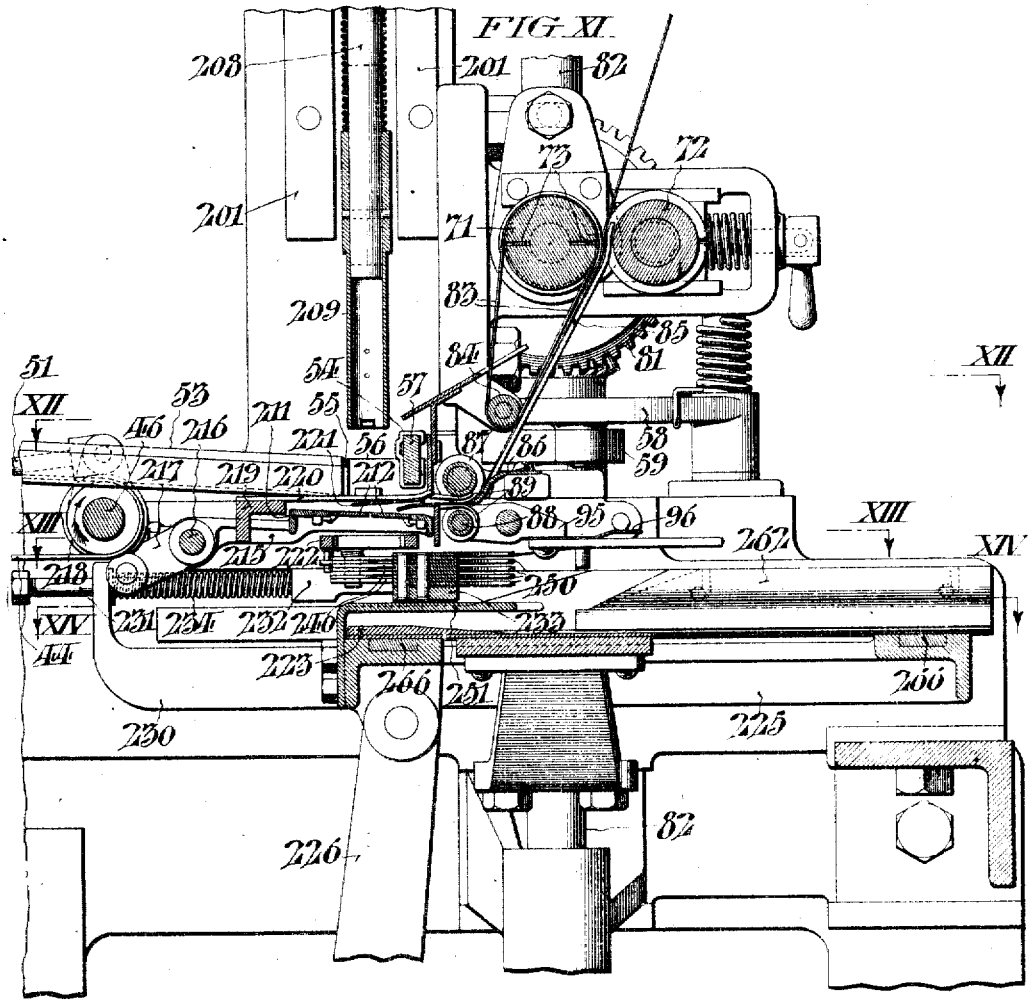
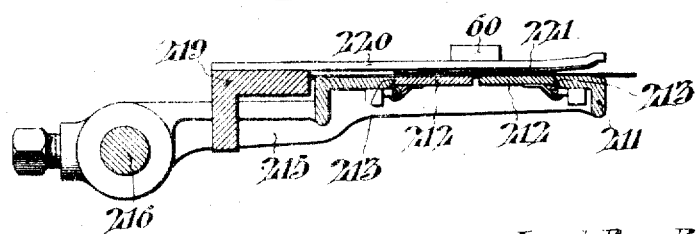

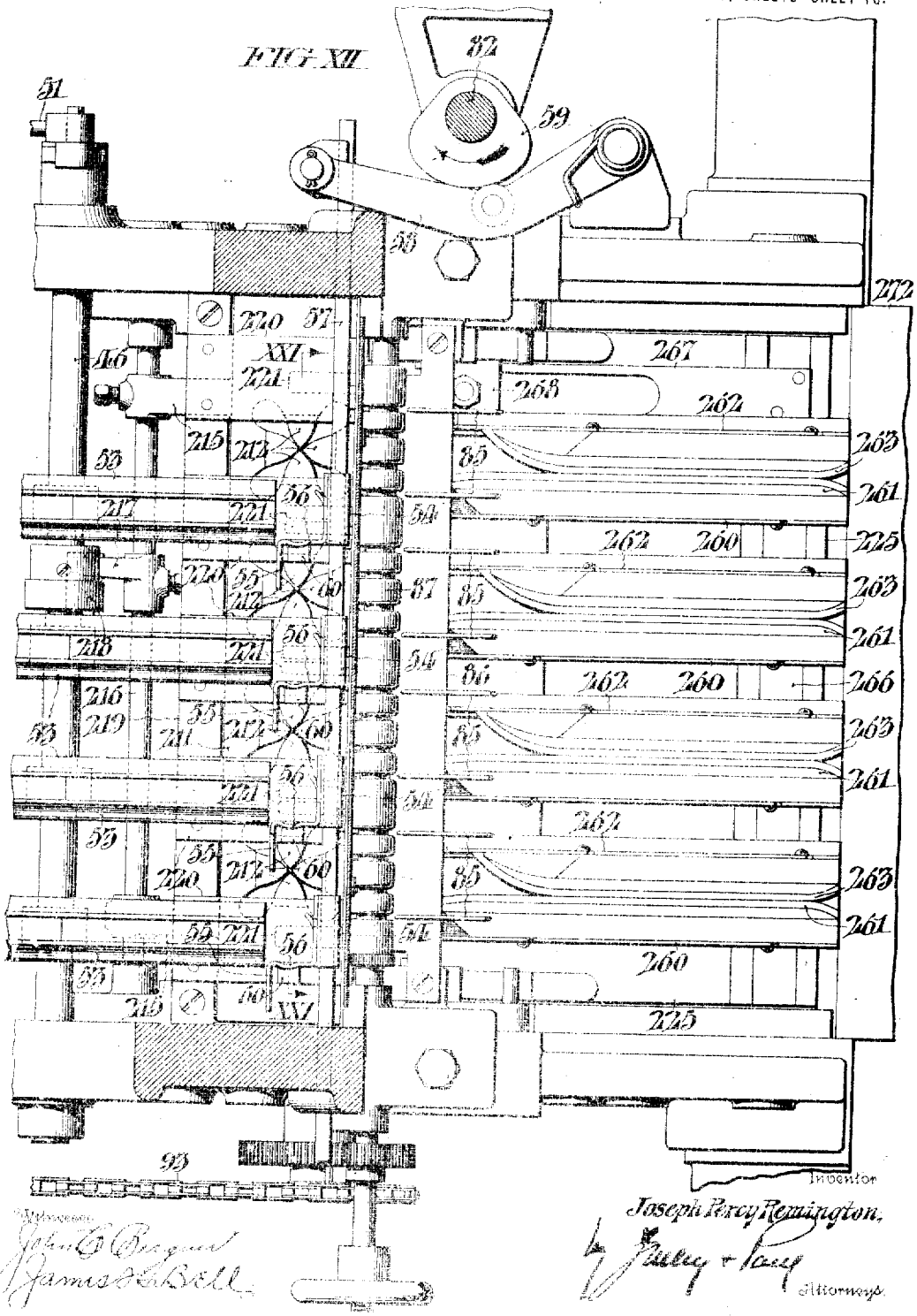

J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 11.
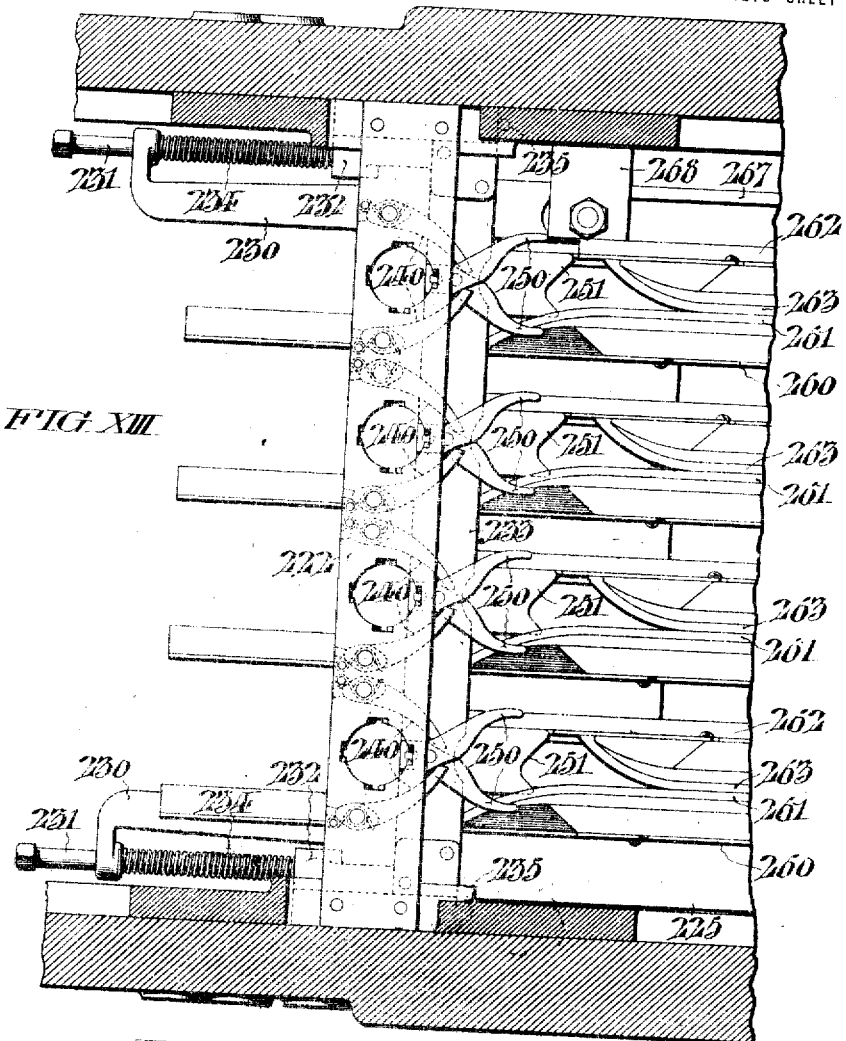
FIG. XIII
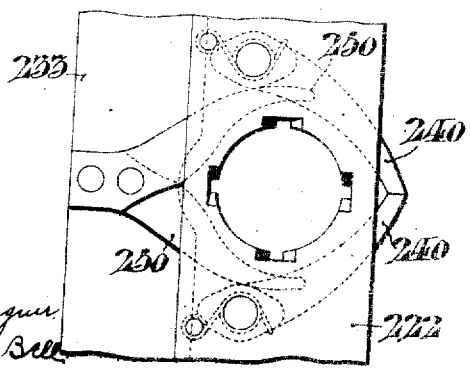
FIG. XLIV
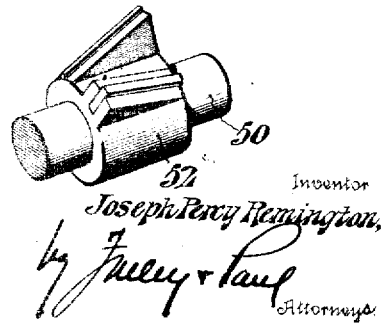
FIG. XLV
Inventor
Joseph Percy Remington,
by Fully & Paul
Attorneys
Witnesses
John C Bugner
James H Bell

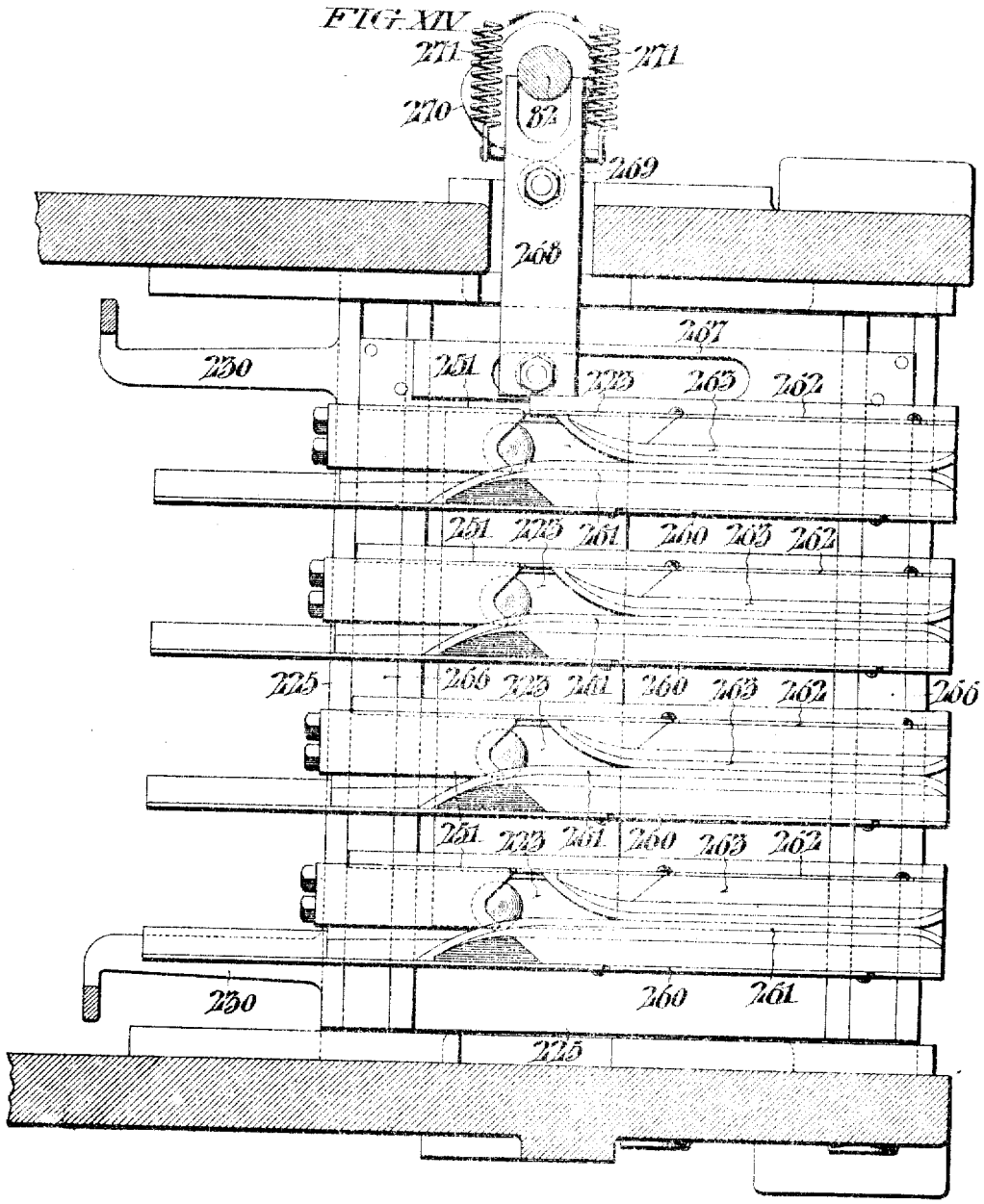

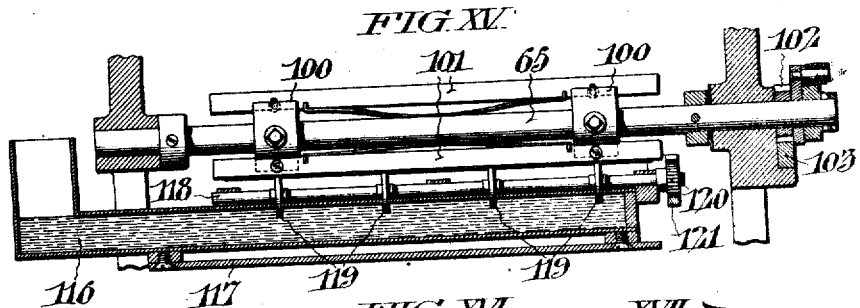
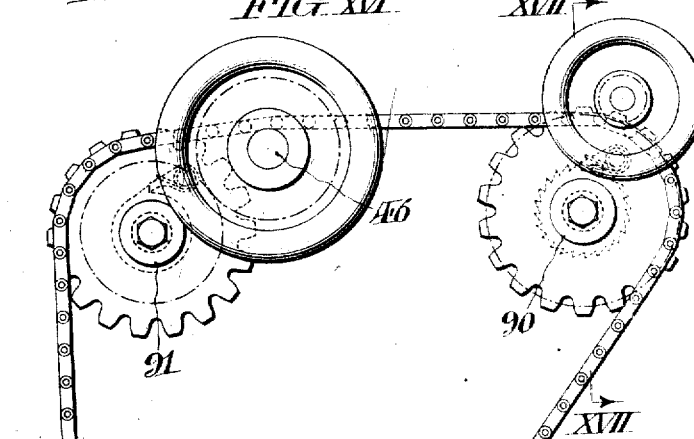
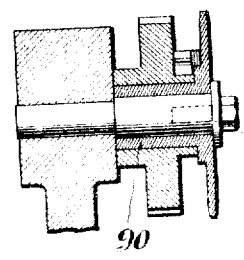

J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 14.
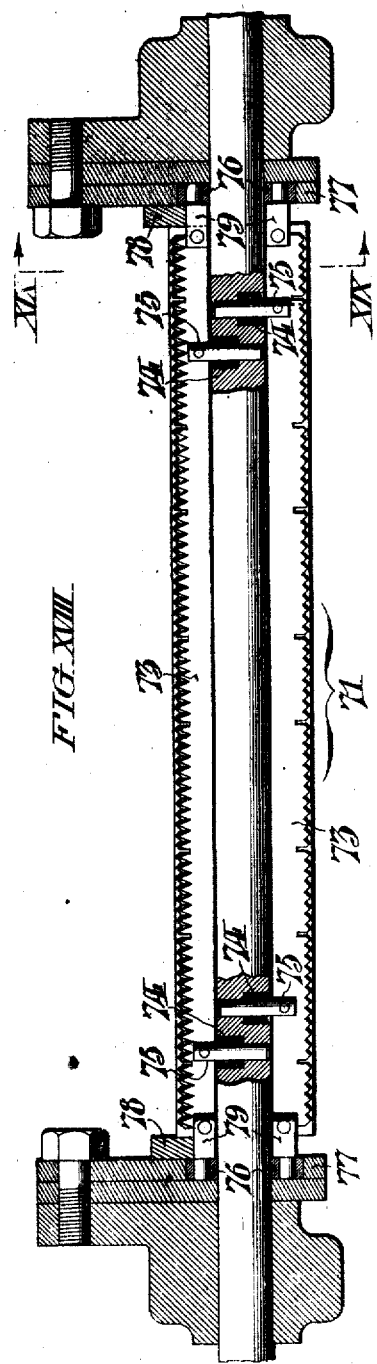
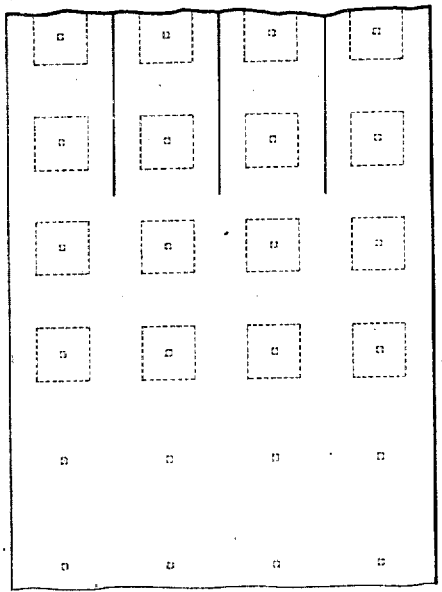
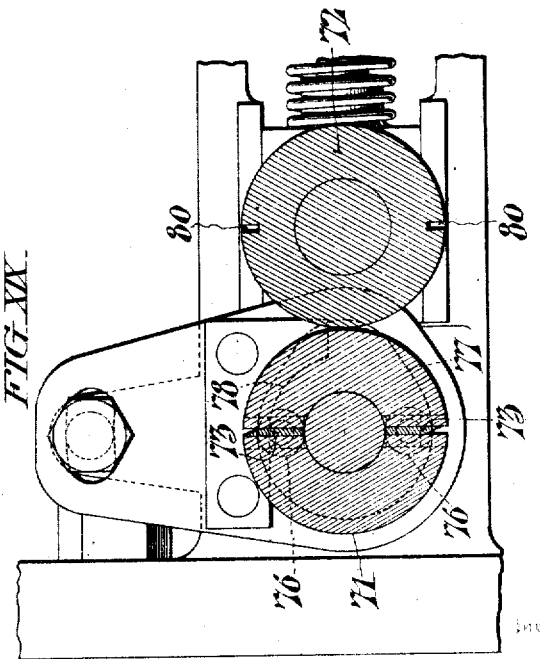
Inventor
Joseph Percy Remington,
by Farley + Paul
Attorneys.
Witnesses
John C. Bergner
James C. Bell J. P. REMINGTON.
MACHINE FOR WRAPPING CONFECTIONS.
APPLICATION FILED DEC. 4, 1915.
1,352,629. Patented Sept. 14, 1920.
17 SHEETS—SHEET 15.
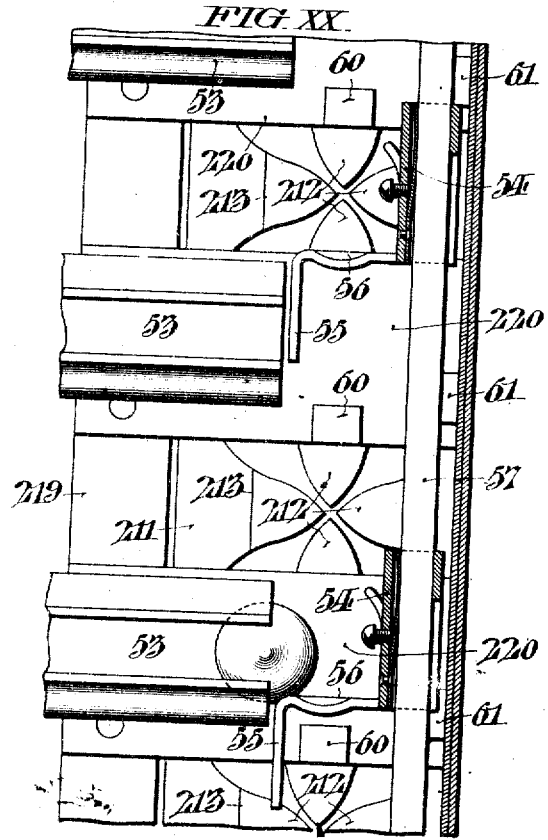
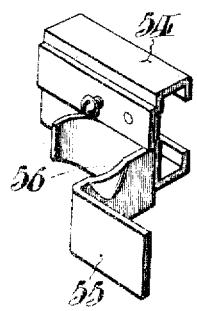
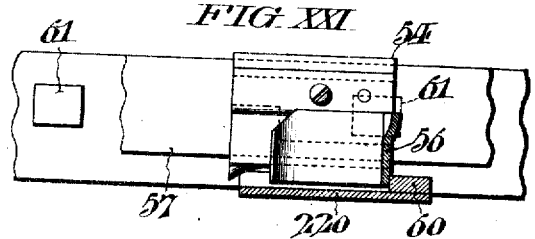
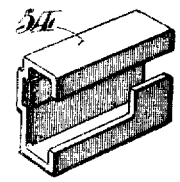
Inventor
Joseph Percy Remington, J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 16.
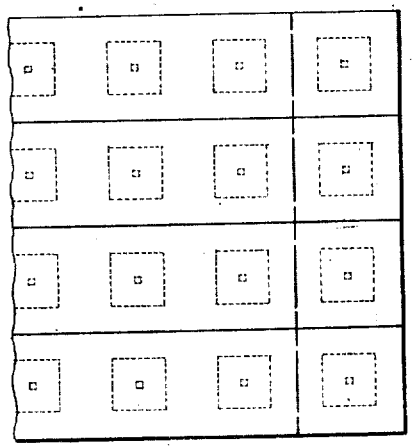
FIG. XXIX.
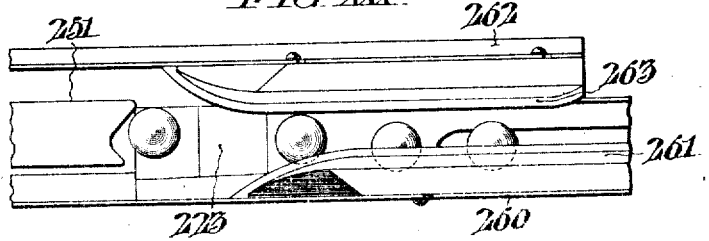
FIG. XXX.
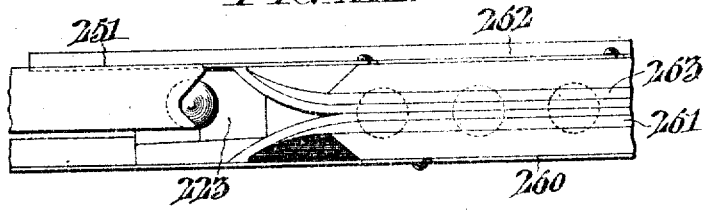
FIG. XXXI.
Witnesses
John C. Berguer
James H. Bell
Inventor
Joseph Percy Remington,
by Finley + Paul
Attorneys J. P. REMINGTON.
MACHINE FOR WRAPPING CONFECTIONS.
APPLICATION FILED DEC. 4, 1915.
1,352,629.
Patented Sept. 14, 1920.
17 SHEETS—SHEET 17.
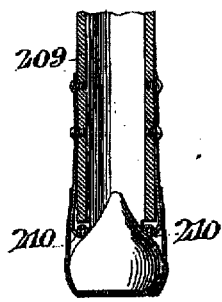
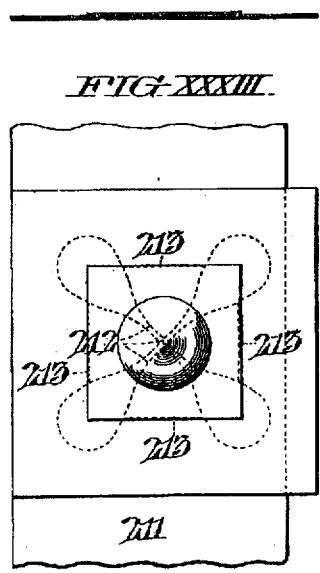
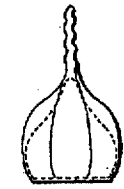
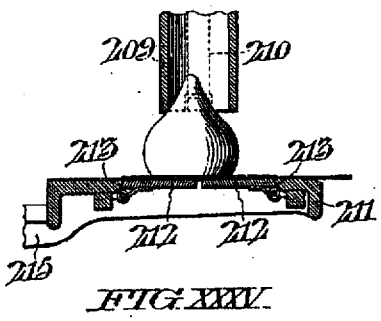
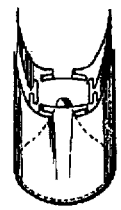
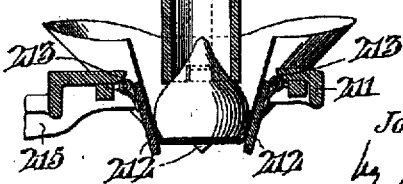
Inventor
Joseph Percy Remington
Witnesses

UNITED STATES PATENT OFFICE.

JOSEPH PERCY REMINGTON, OF PHILADELPHIA, PENNSYLVANIA, ASSIGNOR OF ONE-HALF TO CHARLES DAY AND JOHN E. ZIMMERMAN, DOING BUSINESS AS DAY & ZIMMERMAN, OF PHILADELPHIA, PENNSYLVANIA.

MACHINE FOR WRAPPING CONFECTIONS.

1,352,629.      Specification of Letters Patent.    Patented Sept. 14, 1920.

Application filed December 4, 1915. Serial No. 65,006.

*To all whom it may concern:*

Be it known that I, JOSEPH PERCY REMINGTON, of Philadelphia, in the county of Philadelphia and State of Pennsylvania, have invented certain new and useful Improvements in Machines for Wrapping Confections, whereof the following is a specification, reference being had to the accompanying drawings.

My invention relates to mechanism whereby confections of a generally conical form may be wrapped in an envelop, preferably of tin foil. More specifically, chocolate confections frequently assume this form, and it is desirable that they be individually wrapped in tin foil, and my invention is especially adapted to handling and wrapping such chocolate confections, but it is to be understood that the invention is not thus limited, but covers the similar enveloping of similar objects.

A subsidiary object of my invention is to envelop, along with the confection within the wrapping material, a small slip of paper, (conveniently termed a "sticker"), such as is useful for advertising or other purposes.

According to my invention, I have provided mechanism for the continuous feeding, setting up and alinement of the articles, also mechanism for continuously feeding wrapping material, also mechanism for supplying the sticker, also mechanism for placing the confections on the wrapper, enveloping the confection in the wrapper, compressing and twisting it, and thus completing the package.

In the accompanying drawings, I have illustrated a machine embodying my invention.

Figure I is a plan view of such a machine.

Fig. II is a side view of said machine.

Fig. III is an elevation of said machine upon an enlarged scale, as seen from the delivery end with the delivery chute omitted.

Fig. IV is an enlarged plan view of the basing table near the feeding end of the machine.

Fig. V is a longitudinal central section of the same.

Fig. VI is a detailed view of part of the actuating mechanism for the belt comprised by the basing table.

Fig. VII is a plan view on an enlarged scale of the wrapping and delivery end of the machine.

Fig. VIII is a longitudinal section of the same along the line VIII, VIII, Fig. VII.

Fig. IX is a further enlarged sectional view of the upper part of the mechanism shown in Fig. VIII.

Fig. X is a detail showing in elevation a part of the operative mechanism for feeding the syrup and supplementary stickers to the tin foil.

Fig. XI is a further enlarged sectional elevation of the wrapping mechanism near the discharge end of the machine.

Fig. XII is a sectional plan view along the line XII, XII, Fig. XI.

Fig. XIII is a similar plan along the line XIII, XIII, Fig. XI.

Fig. XIV is a similar view along the line XIV, XIV, Fig. XI.

Fig. XV is a vertical section along the line XV, XV, Fig. IX.

Fig. XVI is a detail view of the driving mechanism for the nip rollers for the tin foil.

Fig. XVII is a vertical section along the lines XVII, XVII, Fig. XVI.

Fig. XVIII is a vertical section on an enlarged scale of the cutting roller for the tin foil.

Fig. XIX is a cross sectional view along the line XIX, XIX, Fig. XVIII.

Figs. XX to XXIII inclusive, are detail views of the slip feed by which the confections are advanced from their guide channels to the envelopment table.

Figs. XXIV to XXVII inclusive, illustrate in detail, the guide channels for the confections and the automatic method of discarding the confections, when received inverted or otherwise displaced.

Fig. XXVIII is a diagrammatic view showing the application of the supplemental "stickers" to the tin foil.

Fig. XXIX is a similar view showing the method of partially severing the tin foil.

Figs. XXX and XXXI are detail views of the wrapping bars, illustrating their operation.

Fig. XXXII is a sectional view of the tin foil with one of the "stickers" adhering to it.

Fig. XXXIII is a plan view illustrating the lines along which the wrapper is folded.

Figs. XXXIV, XXXV, XXXVI, and XXXVII are further detail views illustrating the process of folding the wrapper.

Figs. XXXVIII and XXXIX are detail views illustrating the completion of the wrapping process by the application of the compression fingers and the wrapping bars.

Figs. XL to XLII inclusive, are detail views of one of the depressing plungers.

Fig. XLIII is a detail showing the wrapping table, and the method of clamping the piece of wrapping foil between the table and its coöperating top plates.

Fig. XLIV is a detail showing the compressing fingers of the wrapping mechanism in position to receive a confection and its enveloping foil.

Figs. XLV, to XLVII, inclusive illustrate the means for tilting the feed belts for ejecting wrongly positioned confections therefrom.

Fig. XLVIII, is a detail sectional view through the discharge end of the feed hopper.

I will describe in succession the several groups of mechanism comprised in my machine. For convenience, these may be divided between positioning means, whereby confections, foil and sticker are brought into proper relation for enveloping; and wrapping means, whereby the confection is surrounded by foil, which is thereafter compressed and twisted.

Accordingly the subdivisions will be:—
 (A) Positioning means.
  1. Mechanism for feeding, setting up and alining confections.
  2. The runways and the slip feeds.
  3. Mechanism for feeding and subdividing foil.
  4. Mechanism for associating stickers with each piece of foil.
 (B) Wrapping means.
  1. Enveloping mechanism.
  2. Compressing mechanism.
  3. Twisting mechanism.

(A) POSITIONING MEANS.

*1. Mechanism for feeding, setting up and alining confections.*

This mechanism is shown chiefly in Figs. I, II, IV, V, VI, and XLVIII. Associated with it are means for discharging crumbs and also means for rejecting any overplus supply which may be carried from the hopper.

The hopper 1, which is kept full of confections, is provided at its bottom with an inclined chute 2, leading to an outlet slot protected by a gate 3, which may be suitably adjusted to vary the height of the outlet slot, and consequently the rate at which confections will be fed by gravity from the hopper. Directly beneath this outlet slot, is an endless traveling carrier 4, running on rollers 5, and 6, of which the latter is driven by the worm gear 7, (see Fig. V), actuated by the belt 8, driven by a pulley geared to the main shaft 9, which is driven by a worm gear from a shaft 25, which is in turn actuated from the motor shaft 10. Supplemental vertical endless bands 11, 11, protect the edges of the carrier 4, and travel with it, being driven by the bevel gears 12, (see Fig. IV).

By the operation of the parts thus described, a continuous supply of confections passes from the hopper on to the endless carrier, and is by it discharged promiscuously upon the inclined chute 13. This chute has small perforations 14, formed in it, which permit any crumbs or foreign substances which may be fed from the hopper, to be discharged at this point by way of the chute 15, (Fig. V).

Beneath the discharge end of the inclined chute 13, is the basing or setting up table 16, over the surface of which runs the endless carrier 17. The peculiarity of the motion of this table is that while the whole table reciprocates longitudinally in relation to the machine, the receiving end of it is given a coincident lateral motion. At the same time the endless carrier 17, is given intermittent forward motion. The carrier 17, passes around rollers 18, and 19, which rest in bearings carried by the frame of the table. Of this frame, one cross-piece 20, nearest the receiving end, is pivoted upon a crank 21, set upon vertical shaft 22, driven by the bevel gear 23, from a shaft 24, actuated by a belt from the countershaft 25, by which the main shaft is driven. The other cross-piece 26, of the frame of the table, is pivoted upon a block 27, which slides longitudinally in guides 28.

The drive for the endless carrier 16, is an intermittent one, occasioned by the pawling mechanism shown in Fig. VI, the arm of which is connected by a link 29 to the fixed pivotal support 30, as the result of which the endless carrier which covers the surface of the setting up table has a compound motion, consisting of a longitudinal reciprocation along with the whole table, a lateral reciprocation at the receiving end only of the table, and an intermittent drive operating only as the table moves forward. This combination of motions effects a peculiar jogging of the confections, which have been fed upon it, of such intensity as to tumble them about, the joggling motion being strong enough to constantly right or set upon the flat end, confections resting upon their side, although not strong enough to overturn confections which have been righted. One of the reasons why this action takes place is that an article of generally conical form when resting on its conical surface adds the momentum of its rotary motion to the motion of the joggling surface upon which it rests, while when resting on its base no such momentum exists. As a result of the travel of the confections from one end to the other of this setting up table, nearly all of the confections before reaching the discharge end have been righted or set upright.

Touching the upper surface of the carrier 17, is a brush 33, which derives its rotation from the motion of the carrier. It is useful to spread or distribute the confections more evenly across the width of the carrier 17, and to limit any momentarily too rapid feeding of the confections down the chute 13.

To further assist the joggling motion of the surface of the setting up table, in setting up the confections, a series of guiding surfaces 34, are mounted just above the surface of the carrier in fixed relation to the framework of the machine, and in positions inclined to the long axis of the table, whereby the joggling motion of the carrier constantly drives the confections which rest upon it against these guiding surfaces which thus assist in righting the confections and also arrange them in lanes running lengthwise of the table. Subsequent edge guides 35, push confections toward the entrance of the runways, which will shortly be described.

The endless carrier 17, is maintained properly taut by the tension roller 36, mounted on the bell crank lever 37, and capable of being adjusted by the turn buckle 38, as clearly seen in Fig. V.

Should the mechanisms which have been described, be feeding confections more rapidly than the runways can receive them, or should one or more runways become clogged, any surplus confections rejected by the filled runways pass toward the sides of the table and are discharged by the carrier upon the chute 39, whence such overplus can be collected in a receptacle 40, (Fig. II), and returned to the hopper from time to time.

From this point the confections are distributed among a series of parallel runways each leading to its own wrapping mechanism. In the machine illustrated in the drawings, four such runways are shown, but it will be understood that the number may vary as may be found convenient.

*2. The runways and the slip feeds.*

The carrier 17, discharges by way of an inclined chute, 41. Along this chute and overhanging the discharge end of the carrier are the guide strips 42, spaced to form entrances to the runways and partitions between them. Below the discharge end of the chute 41, is another series of guiding walls 43, which accomplish a narrowing of the runways. Corresponding to each of these runways is an endless carrier band 44, mounted at one end upon a pulley on the shaft 45, and at the other end by a similar pulley on a shaft 46. The shaft 45, is supported upon levers 47, counterweighted by the weight 48, whereby a similar and adjustable tension is put upon all of the endless bands. The shaft 46, is driven by a geared connection with the shaft 91, (see Fig. XVI), which is involved in a sprocket-drive from the shaft 92, as will be hereafter explained.

The endless bands pass between the guiding walls 43, and then across an opening 49, where the bands lack any side protection, and are subjected to tilting means. Extending across this opening immediately beneath the bands is a rock shaft 50, to the operative crank of which is pivoted a link 51, driven by a crank on the end of the shaft 46. This rock shaft 50, carries tilting collars 52, set one beneath each band. One of these is clearly shown in perspective in Fig. XLV. It is provided with two inclined surfaces, one sloping in one direction, and the other in the other, and so related to each other that as the shaft rocks, these inclined surfaces successively push against the lower side of each endless band, and tilt it first to one side and then to the other. The inclination of these surfaces as shown in Figs. XLVI and XLVII, is not sufficient to cause confections resting upright thereon, to tumble off the band, but if confections have reached the band resting upon their side, as shown in Fig. XLVII, the inclination or tilting of the band, due to the tilting collar causes it to fall off, dropping down to a receptacle 40, whence confections may be returned from time to time to the hopper. The open sections of the channels also provide a means of eliminating an excess of confections, since such excess cannot remain on the belts where there are no sides to the channels.

For the remainder of its operative travel, each endless band passes along a metal channel 53. Initially, this channel has low edges, as shown in Fig. XXV, but first one and then the other edge is turned partway over, as illustrated in Figs. XXVI, and XXVII, so that during the latter part of its travel, the band draws the confections through a partially closed channeled runway of such shape that the confections are confined in their lateral movement so that they cannot stagger enough to lock, and in their vertical movement so that they cannot capsize.

In dropped goods, notwithstanding the variations in shape to which they are subject, there is a plane at a determinable height above the base at which all the goods have a common cross-section, and the channel 53, is so shaped that the line of contact of the channel sides, touches the sides of the confections in this plane.

As the confections pass along the runways, they are subject to inspection and the rejection of any imperfect or mis-shaped confections may be thus manually facilitated if desired.

A clutch on the shaft 25, is operated by the lever 280, (see Fig. I), the end of which is connected by a pin and slot connection with the transverse shifting rod 281, by the movement of which the entire machine can be quickly started or stopped by the operator from a point where the lines of traveling confections are subject to inspection.

The channels 53, lead each to a point which is in juxtaposition to the plungers by which the wrapping operation is effected, as will be hereafter described. The end of each channel is protected by a gate 55, forming part of the slip feed 56, by which, when the gate is opened, the endmost confection is received and tolled off to one side, and deposited upon the envelopment table, in proper position. The motion of these slip feeds and the gates which they carry, is a traverse motion, which is accomplished by reciprocation of a slide bar 57, carrying spring clips 54, to which the slip feeds are attached. This slide bar 57, (see Fig. XII), is pivotally attached at one end to a pivoted lever 58, spring pressed against a cam 59, by the rotation of which the slide bar is reciprocated to effect the intermittent opening of the terminal gate of each channel, and the feeding of the endmost confection to the envelopment table for wrapping, as hereinafter described.

The spring clips are slidably set upon the slide bar 57, subject to the adjustable pressure of flat springs interposed between the side of the spring clip and the opposing side of the slide bar, (see Figs. XX, XXI, and XXII). This permits the slip feed to remain stationary, notwithstanding the reciprocation of the slide bar, in the contingency that a confection is but partially fed from the runway channel as shown in Fig. XX. Fixed stops 60, 61, put a proper limit to the play of the spring clips upon the slide-bar.

*3. Mechanism for feeding and subdividing the foil.*

A piece of tin foil suitable for wrapping an individual confection is fed to the envelopment table before the confection is deposited thereon, and the wrapping operation commenced.

The course of the tin foil as it passes from the roll 62, is best seen in Fig. VIII. It first passes over a tension roller 63, thence beneath a free roller 64, and thence beneath the shafts 65, and 66, which carry appliances which are concerned with the association of the stickers with the tin foil as will be subsequently described.

Thence the tin foil passes between the rollers 67, and 68, whereby it is slit into parallel strips corresponding one to each of the several similar wrapping mechanisms with which the machine is provided. These rollers 67, and 68, are geared together (see Fig. III), but are otherwise free, turning only by reason of the travel of the sheet of tin foil between them. The roller 67, carries collars to which are attached suitably spaced knife disks 69. The roller 68, is provided with a corresponding number of knife disks 70, which oppose the knife disks 69, and by coöperating with them produce the desired slitting effect, as shown in Fig. XXVIII.

Thence the tin foil, thus divided into parallel strips, passes between the companion rollers 71, and 72, where each strip is transversely perforated at intervals to subdivide it into pieces each of a suitable size for the wrapping of a confection. The transverse perforation of the foil is shown in Fig. XXIX, from which it will be seen that the perforation is extensive leaving each piece connected to its fellow only by two small unperforated portions.

This transverse perforation is accomplished by the mechanism which is more completely illustrated in Figs. XVIII, and XIX, where it will be seen that the roller 71, has embedded within it, retractable blades 73, with serrated shearing edges. These blades are received within slots which permit the complete retraction of the blades within the roller, and within these slots the blades are outwardly spring-pressed by the coiled springs 74, surrounding the pins 75, which guide the knives in their motion within the slots. The ends of each knife blade carry rollers 76, which rotate in contact with a cam surface 77, formed adjacent to the bearings of the roller and by means of which the blades are pressed back within the roller except during a small part of their rotation coinciding with the instant when it is designed that perforation of the foil shall occur by the protrusion of the blade under the tension of the springs 74. To render this protrusion more rapid, a further cam surface 78, is provided against which runs an end block 79, attached to the blades. The shape of this cam surface 78, is such as to effect sudden release and protrusion of the blade to effect perforation of the foil.

The companion roller 72, is mounted in sliding journal boxes subject to the pressure of coiled springs, by which its pressure against the roller 71, is effected as shown in Figs. XI, and XIX. It is provided with transverse slots 80, located in opposition to the shearing edges of the blades in the roller 71, so as to receive said blades when they are protruded. The rollers 71, and 72, are cross geared as best seen in Fig. VII, and the roller 71, is positively driven by the bevel gear 81, driven by the upright shaft 82, geared to the main shaft 9.

From this point, slitted and perforated foil must be closely guided, and this is accomplished on one side by the endless cords 83, a series of which run around the roller 71, and the free roller 84, being received within grooves in both rollers and constituting a supporting guide for the foil. Coincidentally on the opposite side, the foil is guided by a series of fingers 85, supported on a transverse plate 86, (see Figs. XI, and XII). The extremities of these fingers extend into grooves in the roller 72, and assist in stripping the foil from the roller 72, to which it might otherwise electrically adhere.

These guiding instrumentalities lead the foil between the nip rolls 87, and 88, which are situated in close proximity to the envelopment table onto which the foil is fed with the assistance of stripping and guiding fingers 89, 89. The upper nip roll 87, is geared to and driven by a stud shaft 90, which carries a sprocket wheel in the same plane as two other sprocket wheels (shown particularly in Fig. XVI), on the shafts 91, and 92, and is driven by a common sprocket chain 93, from the shaft 92, which is driven by a bevel gear from the main shaft 9.

The ratio of the gear connection of the upper nip roll 87, is such as to impart to it a comparatively rapid rotation. Its twin nip roll is not positively driven, but its bearings are supported on lever arms 95, whereby it is upwardly spring-pressed under the influence of the springs 96, so as to exert the required pressure between the nip rolls to occasion their effective hold upon the forward edge of each successive piece of almost severed tin foil. As said piece of tin foil enters the nip rolls their rapid rotation immediately completely severs said piece from the continuous strip of tin foil and draws it forward and deposits it upon the envelopment table 211, hereafter to be described. It will be noted that the nip rolls are so spaced with relation to the perforating rollers 71, and 72, that when the forward edge of the foil reaches the nip rolls, there is but one intervening line of transverse perforations as yet accomplished, so that severance can only take place along this line, although immediately following said severance, one of the blades 73, is projected from the roller 71, to effect a succeeding line of perforation.

*4. Mechanism for associating sticker with each piece of foil.*

This machine is provided with mechanism adapted to associate with each wrapping foil a piece of thin paper, conveniently termed a sticker, preferably smaller than each separate piece of tin foil, and resting upon it, whereby the paper, rather than the foil, is in contact with the surface of the confection. Such sticker may conveniently be used as an advertising slip. By the mechanism now to be described, which is best seen in Figs. IX, and XV, these stickers are attached to the surface of the tin foil at such intervals that when the slitting and severance is complete, one sticker is attached to each piece of foil as shown in Figs. XXIX, and XXXII, and rests upon its surface on the envelopment table, in position to receive the confection prior to the wrapping operation. The placing of a drop of syrup upon the foil and pressing thereon a sticker is accomplished as the foil travels respectively beneath the shafts 65, and 66, which have been before referred to. Both operations occur simultaneously, and the rollers are so spaced and the operation is so related to the speed of the tin foil that a sticker is attached to the foil in a properly centered position, with relation to each square into which it is subsequently cut, as shown in Figs. XXVIII and XXIX.

The shaft 65, (see Figs. IX, and XV), has set upon it collars 100, provided with slotted ways which receive outwardly spring-pressed blades 101, one on either side of the roller. The shaft 65, carries a free pinion 102, which gears with the rack 103. pawl and ratchet connection is interposed between the pinion 102, and the shaft 65, so that as the rack bar 103, reciprocates, the shaft 65, is given intermittent half rotations with intervening periods of dwell during which the blades 101, are horizontal. Consequently the outer edge of the lower blade moves during its half rotation, in position to afford spring pressure against the upper side of the foil to sustain it as the drop of syrup is pressed against its under surface by means about to be described. The rack bar 103, (see Fig. X), is seated in a suitable slideway for reciprocation, for which purpose, at one end, it is loosely pivoted to an arm 105, set upon a rock shaft 106. To this arm is also pivotally attached a link 107, connected to a crank 108, (see Fig. VII), on the vertical shaft 82.

The shaft 66, has set upon it collars carrying radial blades 109. It is similarly geared to the rack bar 103, with interposition of a pawl and ratchet motion so as to derive from it intermittent half rotation similar to that explained with relation to the shaft 65.

The agencies which carry the syrup applying means and the sticker magazines, are removably attached to a reciprocating table 110, which has an irregular motion, dependent upon the contact of its supporting rollers with cam surfaces. The table is given reciprocatory motion by reason of its supporting trunnions fitting loosely the ends of arms 111, set upon the rock shaft 106. It also carries rollers 112, which traverse the cam surfaces 113, (see Fig. IX), and rollers 114, which traverse the cam surfaces 115. As the motion of the arm 111, pushes the table from the left hand side of Fig. IX, to the intermediate position of the drawing, the rollers 112, are suddenly elevated by the cam surfaces 113, whereby the agencies which the table carries are thrust into contact with the lower surface of the foil to do their work in opposition to the blades set on the shafts 65, and 66, respectively.

As the continued motion of the arms 111, pushes the table toward the right of Fig. IX, the roller 114, rises as permitted by the cam surface 115, whereby the table is depressed sufficiently to withdraw the agencies in question from contact with the tin foil. During the entire travel of the table from left to right, which has just been described, it is moving with the foil and the rates of motion are nearly enough alike to prevent any tearing of the moving foil as the agencies in question press against it. At the point of such pressure (which is about the middle of the traverse of the table), it is in fact going a little faster than the foil, so that the syrup drop, and sticker are applied with a slight wiping motion which tends to render their work more effective, combing the stickers backward in the magazine.

During the reverse motion of the table, its course of travel is the same, but the agencies which it carries are not pressed against the foil because the half rotation of the shafts 65, and 66, (which occurs during this interval) carries the blades on these shafts away from the foil, permitting it to rise sufficiently (due to the level of the rollers 64, and 68), to avoid such contact.

The syrup pot 116, is mounted upon a slide 117, which is removably set on top of the table 110. A small rotary shaft 118, is carried above the syrup pot, and carries milled collars 119, set at intervals corresponding to the points at which it is desired to apply syrup drops across the width of the foil. The lower portions of these collars reach into the syrup. The shaft 118, is given intermittent rotation by a ratchet wheel 120, set at one end and pawled by a spring-pressed rack 121; assisted by a detent seen in Fig. IX, which is set in a position to act upon the ratchet wheel by reason of the reciprocation of the carrying table 110. Thus one of the collars 119, with fresh syrup on its surface, has its topmost part pressed upwardly once for each reciprocation of the table 110, against the lower surface of the foil, where it is opposed for the time being by one of the outwardly spring-pressed blades 101, on the shaft 65, thus depositing a minute drop of syrup at properly spaced intervals upon the lower surface of the foil.

The table 110, likewise carries a series of vertical sticker magazines 122, each tall enough to contain a pile of stickers which are to be attached one at a time to the foil, the uppermost sticker being sufficiently exposed at the top to attach itself to the gummed surface of the foil which it meets when the magazine is raised, by the motion of the table 110, which motion is at that time opposed by one of the blades 109, on the shaft 66, pressing against the upper side of the foil, thus effecting the firm attachment of the sticker to the foil. The stack of stickers in each magazine is continuously fed upwardly at the proper rate by sliding supports 123, attached to a common cross bar 124, which is advanced by the rotation of the twin screws 125, which carry on their lower ends bevel gears 126, meshing with corresponding gears on the shaft 127, which carries a ratchet wheel 128, engaging a pawl 129, pivoted to the frame of the machine, whereby the reciprocation of the table 110, effects the pawling of the shaft 127, to properly advance the stacks of stickers; so that the uppermost one may always be in position to be properly pressed against the foil. If additional slips are accidently detached from the pile, they are dropped into the receptacle 130, (see Fig. VIII).

It will be noticed that the rollers 68, 71, 84, and the upper nip roll 87, against the surfaces of which the underside of the foil consecutively passes, are grooved at intervals corresponding to the lines of syrup drops. This is a precautionary measure, so that if for any reason a sticker does not adhere to the foil at the point where the syrup drop has been applied, the syrup, instead of being rubbed on to the rolls mentioned as the foil runs over them, and ultimately rendering the rollers sticky, passes along the grooves of these rollers without contact therewith.

By the coöperation of the parts which have been just described a sticker is attached to the foil at points corresponding to the centers of each of the squares into which it is to be subdivided, and as each square is driven by the nip rolls into position on the envelopment table, a single sticker rests on top of such piece above its center, so that as the confection is pushed to the center of the foil it comes to rest about in the center of the attached sticker.

(B) Wrapping Means.

*1. Enveloping mechanism.*

A cross head 200 reciprocates in slideways 201, directly above the envelopment table. Reciprocatory motion is imparted to this cross head by the arms 202, set on the rock shaft 203, which carries an arm to which is pivoted the rod 204, the other end of which is slotted to receive the shaft 92, which carries a cam disk 205, having a cam groove 206, in which runs the roller 207, set upon the side of the rod 204. By following the shape of the cam groove 206, it will be seen that the descent of the cross head is accomplished in two stages.

Set upon the cross heads are plungers 208, one corresponding to each aperture in the envelopment table. These plungers are provided with sliding tubular extensions 209, which surround the lower end of the plungers and are connected to them by pin and slot connections. A coiled spring surrounding the plunger projects each tubular extension to its full extent until resistance is met, whereupon, the extension retreats, subject to the pressure of the spring, thus creating a yielding pressure at the lower end of the plunger. This prevents the descent of the plunger, when it comes in contact with a confection to be wrapped, from exerting such pressure as might deform the confection. It also serves to prevent injury to the hands of operators working beneath the plungers while they are in operation. The lower end of the tubular extension of the plunger is provided on two sides with opposed spring fingers 210, (see Figs. XL, XLI, and XLII), which yield as the plunger descends upon the confection. When the plunger reaches its lower limit and is about to return, these fingers springing together, thrust the confection from the end of the tubular extension, thus preventing the possibility of the confection adhering to the plunger.

The envelopment table 211, is provided with a series of apertures each normally closed, by four hinged flaps 212, the shape of which most clearly appears in Figs. XII, and XXXIII. These are hinged to the squared edges 213, of the apertures, in the table, which are provided with lobed corner extensions and are considerably larger in diameter than the confections to be enveloped. The flaps are hinged, one in the middle of each squared side of the aperture. The flaps are roughly triangular in shape with slightly convex sides, of such shape that their points nearly meet while the sides of adjoining flaps retreat from each other as they approach the base or hinged part of the flap.

These flaps are supported in the plane of the surface of the table by springs which appear clearly in Figs. XXXIV, and XXXV, the springs being weak enough to readily yield to permit the flaps to recede and allow the confection resting upon the surface of the flaps to be depressed through its aperture in the envelopment table, when the plunger descends. The table 211, is supported by arms 215, fast upon a rock shaft 216, upon which shaft is set an arm 217, (see Fig. XI), carrying a roller in contact with a cam disk 218, set upon the shaft 46, by means of which the table is given a slight up and down motion.

Just above the plane of the envelopment table is a cross piece 219, supporting longitudinal slats 220, which are alternately disposed between the table apertures and somewhat overlap the edges thereof, affording plain surfaces with which the top of the table comes into substantial contact when in its uppermost position. Beneath these slats are spring fingers 221.

The motion of the table 211, is so timed that the feeding of the pieces of foil thereto occurs when it is in its lowermost position, as shown in Fig. XI. The square pieces of foil are so fed that their corners correspond to the lobed extensions of the aperture in the table. Thereafter the table rises until its edges have nearly or quite touched the slats which have been referred to, whereby the spring fingers 221, exert sufficient pressure upon the edges of the pieces of foil lying upon the table to hold them firmly in position, notwithstanding the lateral sliding of the confections upon their surfaces, due to the action of the slip feeds 56, as they feed the confections to the table.

Beneath the line of the table is the transverse plate 222, with circular apertures centered to the axial lines of the plungers, and also to the apertures in the table. These circular apertures are clearly shown in Fig. XIII, and it will be observed that they are somewhat cut away at four points corresponding to the lines along which the flaps of the envelopment table are depressed. These cut away points accordingly act as stops to limit the motion of the flaps when they are driven downward by the descent of the plungers, so that they form the sides of a square tube through which the plungers drive the confections and the wrappers which lie beneath them as seen in Fig. XXXV.

Referring now to Figs. XXXII to XXXVII, inclusive, the operation of the parts which have been described to effect the folding of the foil about the confection, may be made clear. In Figs. XXXII and XXXIII, the foil and the sticker resting upon it and the confection resting upon the center of the sticker, are seen centered over the points of the flaps of the supporting table. When the confection descends under the pressure of the descending plunger, the flaps press the sides of the square piece of tin foil closely against the confection, while the corners of the square piece of foil with their longer radii are not thus pressed because they pass down through the lobes of the aperture of the table.

This action is clearly illustrated in Fig. XXXV. The corners of the foil in passing through the lobed extension of the table aperture owing to the wiping action of the flaps 212, become conically fluted as shown diagrammatically in Fig. XXXV, so as to have the form of rounded convolutions overlapping the previously infolded edges or side portions. In the further descent through the circular aperture of the plate 222, the envelopment assumes the form shown in Figs. XXXVI, and XXXVII. The circular aperture causes the fluted corners of the foil to be collapsed and flattened directly inward and even compressed against the sides of the confection, over the portions of the foil previously engaged by the flaps 212. The plunger, 209, it will be seen, permits access of the ends of the receded flaps, 212, to the confection, after it has been driven down from the table aperture a sufficient distance, so as to act as strippers to prevent adhesion of the confection to the end of the plunger and retraction thereof by the plunger in its subsequent ascent.

In this way the sides of the square piece of foil are utilized to completely envelop the confection, while the longer projecting corners are free to be compressed and twisted around the apex of the confection, and thus to completely close the envelop, by means of the twisting mechanism which will hereafter be described.

It has previously been explained that the descent of the plunger is accomplished in two stages. The dwell between the first and second stage is important in order to obtain a more delicate pressure of the extensions of the plungers, upon the confection which serves the purpose of properly centering it, while the foil is still clamped, (see Fig. XXXIV), but sufficient pressure is exerted upon it to slightly depress the flaps upon which the confection rests. After the centering operation is completed, the further descent of the plunger presses the confection and the foil on which it rests through the table, past the receded flaps, after the enveloping table has been lowered to release the foil. Consequently the foil freely descends through the square aperture formed by the folding down of the flaps.

The complete descent of the plunger drives the confection and its wrapper down through the table, and the plate 222, as already described until it rests upon a fixed compression surface 223, beneath, where compression of the foil around the apex of the confection is accomplished, as will now be described.

2. Compressing mechanism.

Immediately beneath the parts just described, is a longitudinally reciprocating frame 225, sliding in suitable ways in the framework of the machine. Reciprocation is imparted to this frame by the pivoted arm 226, which carries a roller 227, running in a cam groove 228, in disk 229, set on shaft, 92. The reciprocating frame 225, is provided at either side with bracket arms 230, through the upturned extremities of which pass rods 231, attached to slide blocks 232, running in suitable ways, and supporting between them the sliding cross bar 233. Although the longitudinally reciprocating frame 225, and the sliding cross bar 233, reciprocate substantially together in the same direction, there is a lost motion between them, due to the sliding connection of the bracket arms 230, with the rods 231, the limit of this being determined by the nuts which form the heads of rods 231, and coiled springs 234, which are interposed between the slide blocks 232, and the bracket arms 230. Accordingly, the limits of the motion of the sliding cross bar 233, are fixed in one direction by the extent to which the bracket arms 230, push it back after it comes in contact with the heads upon the rods 231, while the limit of its motion in the other direction is fixed by the pins 235, (see Fig. XIII).

The compression mechanism is operated by the motion of the sliding cross bar 233, in relation to the fixed transverse plate 222. Both of these members carry compression fingers in horizontal planes, which lie sufficiently above the fixed compression surfaces 223, to clear the bodies of confections resting upon the compression surfaces, and affect only the apexes of the confections or portions of the wrapping foil which project thereabove.

These compression fingers are best seen in Figs. XIII and XLIV, when taken in connection with the section shown in Fig. XI. Pivotally affixed to the lower side of the plate 222, are sets of opposed yielding compression fingers 240. Each of these fingers has four fellows yieldingly pivoted on the same pivot and situated in horizontal planes immediately beneath each other, as seen in Fig. XI, there being sufficient interval between these planes to permit the passage between them of the movable compression fingers hereafter to be described.

Each four yielding compression fingers 240, are offset by four similar fingers to make a set, and as shown in Fig. XIII, there are four such sets, one for each plunger. Their pivotal relation to the plate 222, is such that when the plungers descend, the confections are driven through the apertures of plate 222, and rest with their apexes between opposing yielding fingers.

To effect the compression, the sliding cross bar 233, has set in fixed relation to it, fingers 250, the shape of which appear best in Fig. XIII. They are arranged in horizontal planes, one above the other, these planes so coinciding with the interspaces between the planes of the yielding compression fingers 240, that the fixed set of fingers on the sliding cross bar 233, pass directly across and through the opposed yielding fingers 240, without interference, one with the other, provided there are no confections standing between the two. While the cross bar 233, occupies that position of its movement which is nearest the receiving end of the machine, the plungers descend and drive the confections on to the compression surface, while the fingers are in the position shown in Fig. XLIV. Thereupon, the reciprocation of the sliding cross bar 233, brings the parts into the position shown in Fig. XIII, whereby a passage of one set of fingers 250, toward, and thence through the yielding coöperating fingers 250, gradually effects the required compression. Immediately after this is accomplished, the ejectors 251, which are set upon the reciprocating frame, 225, are thrust forward beneath the compression fingers their motion continuing after that of the sliding cross bar has ceased, by reason of the provision of lost motion which has been explained. Thereby, the ejectors 251, drive the enveloped confections into the reach of the twisting mechanism, which will now be described.

*(3) Twisting mechanism.*

The twisting is accomplished by the coöperation of fixed surfaces with parallel moving surfaces. The fixed surfaces are provided with fixed twisting bars 260, each of which has a vertical and horizontal component, the latter comprising one of the compression surfaces already referred to. The vertical component serves as the point for attachment of a rubber surface 261, the shape of which will be seen in Fig. III, while the horizontal component constitutes a channel along which the confections travel as they are twisted. These twisting bars 260, are mounted in fixed relation to the framework of the machine. Paired with the fixed twisting bars are movable twisting bars 262, secured upon laterally sliding bars 266, received in suitable cross runways in the longitudinally reciprocating frame 225.

To the movable twisting bars 262, are attached opposing twisting surfaces 263, which, coöperating with the surfaces 261, provide channels or grooves formed to roughly correspond to the shape of the confections passing through them. The moving twisting bars 262, have a two-fold motion, consisting of, first, their longitudinal reciprocation, due to the similar motion of the reciprocating frame 225, and combined with this a lateral motion due to the lateral reciprocation of the sliding bars 266. These are attached to bracket bar 267, which has a pin and slot connection with the slide bar 268, having a roller 269, in contact with a cam 270, on the shaft 82. This cam, operating in opposition to coiled springs 271, effects a reciprocation of the bar 268, and therefore of the movable twisting bars and is so timed in relation to the longitudinal reciprocation of those bars that the travel of the movable twisting bars in the direction from the feed end of the machine, to the discharge end of the machine is accomplished while they are in closed relation to or contact with their fixed twisting bars, but the motion of the movable twisting bars in the opposite direction is accomplished while they are withdrawn from this close relationship. This will perhaps be best understood by reference to Figs. XXX, and XXXI, the latter of which shows paired twisting bars in the close relation to each other, which relation they assume when the movable bars have completed their motion toward the discharge end of the machine. Thereupon, the twisting bars separate, and move to the position shown in Fig. XXX, in which position confections which have not previously been twisted are seen to be within reach of the movable twisting bars when they move toward their fellows, as they are about to do. The motion of the push fingers 251, affords the necessary feed to continuously supply confections singly for each reciprocation of the movable twisting bar. At each reciprocation of these bars the confections between them are twisted and moved a definite distance toward the discharge end of the machine, so that by the time the confections reach the other end of the twisting bars through the rotation imparted to them, they have been several times twisted and are by the last motion, discharged upon the chute 272, with their wrapping entirely completed.

Claims for the confection conveying and positioning means have been submitted in my divisional application, filed May 3, 1917, Serial No. 166,134.

Having thus described my invention, I claim:

1. In a machine of the class described, the combinaton of a row of envelopment tables with their enveloping mechanisms; means for supplying righted confections in parallel streams at one side of said row of envelopment tables and feeding them one by one at intervals into position upon each of said tables; means for feeding a suitable width of sheet wrapping material, subdividing it lengthwise into strips, and advancing said strips in parallel to the envelopment tables from the side opposite the confection supply; means for subdividing from said strips, transversely, pieces of suitable length for enveloping confections and feeding such pieces upon the envelopment tables, in position to receive the confections, during the intervals between the feed of the latter thereto; and means for bringing the enveloping mechanisms into action during the interval between the feed of successive confections to each table subsequently to the corresponding feed of wrapping material upon the tables.

2. In a machine of the class described, the combination of a row of envelopment tables with their enveloping mechanisms; means for feeding to said tables wrapping material, in a width equal to the length of said row, from one side thereof, subdividing the material lengthwise into parallel strips corresponding to the tables as it approaches them, and subdividing from said strips, transversely, pieces of suitable length for enveloping confections and feeding such pieces in succession upon the tables; means for supplying righted confections at the other side of said row of envelopment tables in parallel streams directed to the intervals between the envelopment positions of said tables; means for feeding confections from said streams one by one lengthwise of the row of tables to the enveloping positions of adjacent tables in the row at intervals corresponding to the feeding of successive pieces of wrapping material to the tables; and means for bringing the enveloping mechanisms into action after each feed of confections to the enveloping positions of the tables.

3. In a machine of the class described, the combination of a row of envelopment tables with their enveloping mechanisms; means for feeding a suitable width of tin foil, subdividing it lengthwise into strips, and advancing said strips in parallel to one side of the row of tables; and means for subdividing from said strips, transversely, pieces of suitable length for enveloping confections and feeding such pieces upon said envelopment tables in due relation to the action of their enveloping means.

4. In a machine of the class described, the combination of a row of envelopment tables with their confection-enveloping mechanisms; means for feeding to said tables tin foil, in a width equal to the length of said row, from one side thereof; means for applying adhesive to said tin foil at transverse intervals corresponding to the enveloping positions of the tables and at longitudinal intervals corresponding to the length of material required to envelop a confection; means for pressing stickers against the foil in contact with the adhesive; means for subsequently subdividing the tin foil lengthwise into parallel strips corresponding to the tables as it approaches them and for subdividing from said strips, transversely, pieces of suitable length for enveloping confections with the stickers centered thereon and feeding such pieces in succession upon the tables.

5. In a machine of the class described, the combination of a row of envelopment mechanisms; means for feeding tin foil sidewise to said row of mechanisms in width corresponding to the length of the row; means for placing adhesive upon the surface of said tin foil at points corresponding to the centers of division thereof suitable to afford separate envelopment wrappers for each of the enveloping mechanisms; means for subdividing said tin foil accordingly, both longitudinally and transversely, and feeding the subdivisions to the envelopment mechanisms; means for pressing stickers against tin foil in the region of each application of adhesive to be carried therewith to the envelopment mechanisms.

6. In a machine of the class described, a continuously traveling sheet of tin foil, means for subdividing the same transversely without interruption of its continuous travel, and means for affixing to the surface thereof drops of adhesive material at properly spaced intervals comprising a receptacle for said adhesive material, a roller partially immersed therein, and means for imparting to said roller motion whereby at properly spaced intervals it is brought into contact with the traveling tin foil and caused to move temporarily in contact with it.

7. A mechanism for attaching stickers to an endless roll of traveling foil which consists of means for progressing the foil, a table reciprocating beneath the foil, means mounted upon the table for carrying a drop of adhesive material, means for raising the table into contact with the foil while it is traveling in the same direction as the foil, means for pressing the foil down upon the adhesive material during this contact, said means being removed from the foil during the return travel of the table, so that the foil is allowed to spring to a position where the means carrying the adhesive material shall not come in contact with the foil, additional means carried by the same table for pressing a sticker against the part of the foil where the spot of adhesive material rests at a subsequent reciprocation of the table.

8. The method of wrapping conical confections which consists in placing a confection centrally upon a squared piece of foil; folding in the side portions of the foil against the surface of the confection, thus forming the corner portions into rounded convolutions overlapping the sides; collapsing and flattening these overlapping convolutions directly inward upon the confection and compressing the foil to its surface; and twisting the foil in the region of the apex of the confection.

9. Mechanism for wrapping a conical confection in a squared piece of foil, comprising an envelopment table with a squared aperture, flaps which collectively partially close said aperture yieldingly hinged one to each side of said squared aperture, a plunger by the descent of which a confection resting upon the squared foil with the corners of the foil corresponding to the corners of the aperture is forced down through the center of said aperture, so that the flaps effect the infolding of the side portions of the foil against the confection, leaving the corner portions free to be folded and compressed over the side portions.

10. Mechanism for wrapping conical confections comprising superimposed plates with a squared aperture in the upper and a circular aperture in the lower plate, a plunger by the descent of which a confection is driven successively down through the square and circular apertures, flaps attached to the side of the square aperture whereby as the confection descends through it, a square piece of foil has its side portions folded in against the confection, the diameter of the circular aperture being such as to subsequently fold down the corner portions of the foil against the previously infolded side portions.

11. Envelopment mechanism for conical confections comprising an apertured table for receiving wrapping foil and confections; yielding flaps hinged to the sides of the aperture, adapted to recede and permit descent of a confection resting on a piece of foil on said table, and to cause its envelopment in the foil during its descent; and a plunger movable and adapted to engage such confection so resting on said table and drive it downward through the aperture past the receded flaps while permitting access of the lower ends of said receded flaps to the enveloped confection to act as strippers and prevent adhesion of the confection to the plunger on its ascent.

12. Mechanism for wrapping conical confections in foil, comprising means for infolding edge portions of a piece of foil upon a confection resting thereagainst to envelop the confection and form the remaining portions of the edge of the foil into rounded convolutions overlapping said infolded portions; means for collapsing said convolutions and flattening them directly inward upon the aforesaid previously infolded portions; and twisting mechanism whereby the foil is subsequently twisted in the region of the apex of the confection.

13. In mechanism for wrapping conical confections, the combination of means for folding foil around the confection and parallel surfaces one intermittently reciprocating in proximity to the other, whereby the partially wrapped confections as they advance between said surfaces have the upper portion of their surrounding foil twisted in the region of the apex of the confection.

14. In mechanism for wrapping conical confections, the combination of means for feeding foil around the confection, parallel surfaces intermittently reciprocating in proximity to one another, and means for advancing the wrapped confections one at a time between said parallel surfaces, whereby the wrapped confections are advanced successively between said surfaces and at each advancement have the upper portion of their surrounding foil twisted in the region of the apex of the confection.

15. Twisting mechanism for wrapped confections, consisting of intermittently reciprocating parallel bars, the opposed surfaces of which are shaped to conform to the shape of the confections and covered with yielding material.

16. In mechanism for wrapping confections, the combination of ways along which enveloped confections pass, a stationary bar associated with said ways, and a bar having a reciprocation longitudinally with reference thereto to engage and twist the wrapping in its movement in the direction of travel of the confections.

In testimony whereof, I have hereunto signed my name, at Philadelphia, Pennsylvania, this thirtieth day of November 1915.

JOSEPH PERCY REMINGTON.

Witnesses:
JAMES H. BELL,
E. L. FULLERTON.